UNITED STATES PATENT OFFICE.

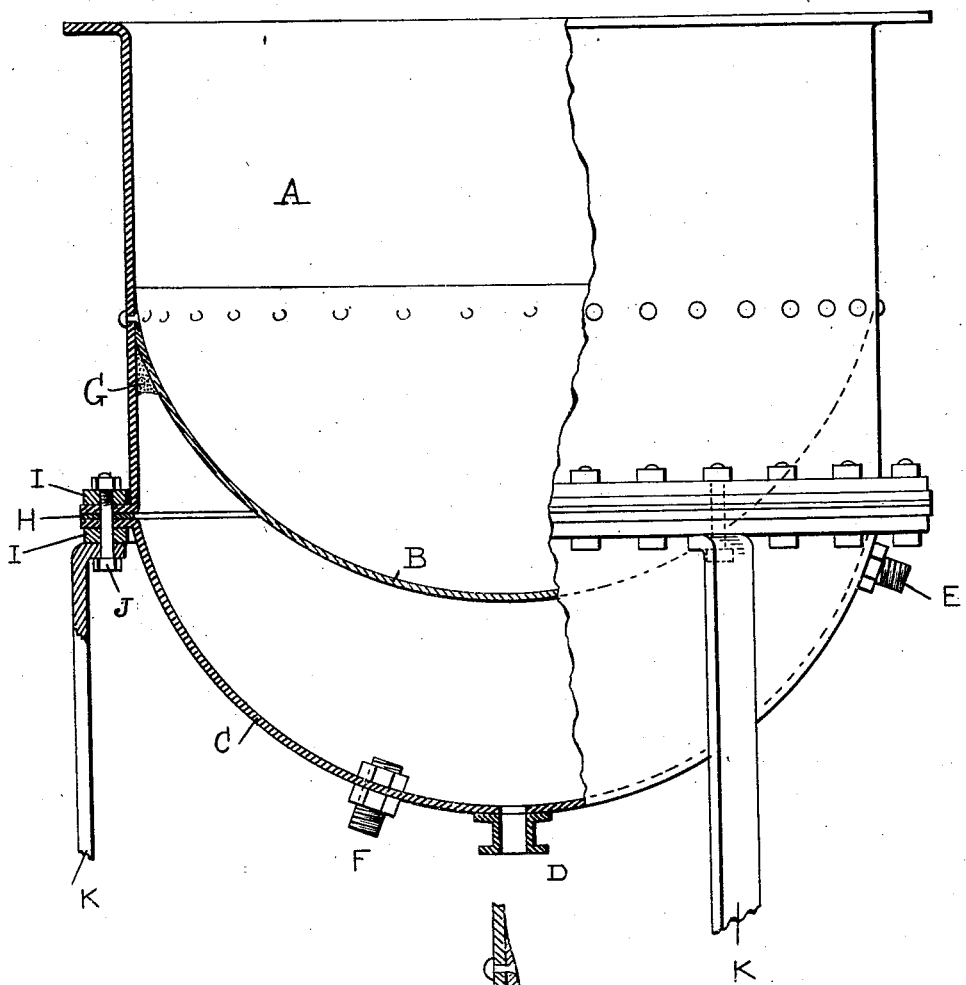
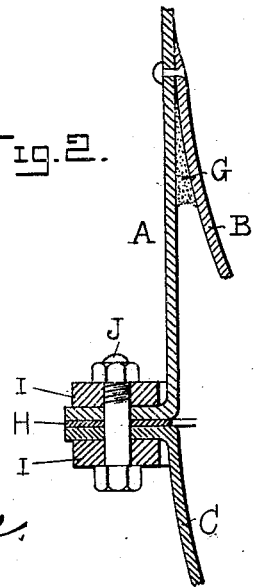

MAX W. JOHNS AND WASHINGTON IRVING KAUFMAN, OF LOUISVILLE, KENTUCKY; SAID JOHNS ASSIGNOR TO SAID KAUFMAN.

JACKETED KETTLE.

SPECIFICATION forming part of Letters Patent No. 697,627, dated April 15, 1902.

Application filed February 2, 1901. Serial No. 45,737. (No model.)

*To all whom it may concern:*

Be it known that we, MAX W. JOHNS and WASHINGTON IRVING KAUFMAN, citizens of the United States, residing at Louisville, in the county of Jefferson and State of Kentucky, have invented certain new and useful Improvements in Jacketed Kettles; and we do hereby declare the following to be a full, clear, and exact description of the invention, such as will enable others skilled in the art to which it appertains to make and use the same.

Our invention relates to cooking, boiling, or cooling apparatus heated or cooled by steam, water, or other medium applied by means of a jacket or shell attached to the vessel.

In jacketed boiling-pans, heaters, coolers, and like apparatus as usually constructed the inner bowl of the jacket is secured to the outer jacket by riveting or soldering. This soldering in the present method of construction must be done after the outer and inner jackets are riveted together by heating through the copper lumps of soldering metal which have been previously attached to the proper position to the inside of the outer jacket. During this process the part of the joint to be soldered is invisible and inaccessible. In attaching parts it is generally difficult to secure a steam, water, or air tight joint between the inner and outer jackets, and in separating same for repairs the rivets must be cut out and the solder melted. Furthermore, in this the usual method of making such apparatus the outer jacket is constructed of a bowl-like bottom, which is brazed to an upper cylindrical continuation. This brazing is difficult to make, and the joint is unreliable. Sometimes such apparatus is constructed by flanging together both the inner and outer bowl of the jacket and the upper cylindrical continuation. This method is objectionable, as the inside of the vessel is not smooth, but has an indentation or recess running around the inside of the vessel at the flanged joint, furnishing a pocket for the accumulation of dirt and refuse, which is difficult to clean or keep so.

The object to be attained by our construction is the designing and making of a jacketed heating or cooling vessel which will permit of easily separating the inner and outer shells of the jacket in order to reach any part requiring repairs and to dispense with brazing of any part of the steam-jacket. This we do in a way which will leave the inside surface of the kettle perfectly smooth, without any indentations or recesses which would provide a pocket for the collection of dirt or refuse.

In order to make our invention more clearly understood, we have shown in the accompanying drawings means for carrying the same into practical effect without limiting our improvements in their useful applications to the particular construction which for the purpose of illustration we have delineated.

Figure 1 is a general drawing showing part elevation and part section of the kettle, and Fig. 2 is a detail showing manner of accomplishing the desired object.

In Fig. 1, A is the upper cylinder, forming sides of kettle. B is the inner shell of steam-jacket. C is the outer shell of steam-jacket. D is the drain-plug or draw-off connection, and E and F are respectively the inlet and outlet of the steam-jacket, and K the legs supporting kettle.

The same letters as above used apply to same parts in Fig. 2, in addition to which, G represents solder to close thoroughly the space between A and B. H is a rubber gasket, red lead, or other device or packing to prevent the leakage of steam from the jacket. I is a pair of flange-rings to properly stiffen the joint, and J the flange-bolts for securing the outer shell of steam-jacket to the upper cylinder.

The lower end of cylinder A and upper rim of outer shell C are flanged to bolt together. The upper rim of inner shell B is hammered down so as to lie smoothly against the cylinder A. Shell B is riveted to A with rivets having flat heads inside and the space between A and B thoroughly filled with solder, as at G, the solder to be tightly rammed in and "sweated." The riveting and solder between A and B will thoroughly prevent any leakage between A and B, while the gasket or other device H will prevent the leakage of any steam to the outside. The flanged connection, however, makes accessible all of the inner surface of steam-jacket and the connections D, E, and F.

The advantages of our device consist in the following points:

First. In soldering the inner bowl of the jacket at the rivets to the upper cylinder the joint is visible and accessible during the entire process of soldering, enabling the operator to secure a uniform and secure joint.

Second. It does away with the necessity of brazing the outer bowl of the jacket to the upper cylindrical continuation, as it is possible to make out of one piece of metal a bowl to connect to the other part at the flanged joint.

Third. While the inner and outer bowls are readily separable or detachable without cutting the rivets or melting the solder, it has the advantage of retaining a smooth inner surface.

Fourth. Kettles used by chemists and others employed in the various arts and sciences sometimes require to be tinned or otherwise specially treated or coated. In applying or renewing such application or coating it is not necessary to separate the apparatus from its steam, water, or other connections or from its stand. The upper cylinder and inner bowl being the only part to be thus treated can, by unbolting the flanges, be readily separated from the remainder of the apparatus, themselves remaining intact and securely and smoothly joined together, and be subjected to the required treatment and as readily replaced. In addition, the upper cylinder and inner bowl can be similarly removed and replaced whenever it may be necessary to get at the inner surface of the outer bowl or jacket.

Inasmuch as this design provides a means of getting a perfectly-smooth inside to the boiler, steam-tight joints between all of the parts, and a manner of easily reaching the inner surfaces of the steam-jacket, it is desired to cover these improvements in their application to boiling or cooling vessels of either "open-top" or "vacuum" design.

What we claim is—

1. In a jacketed kettle, the combination of an inner bottom shell, a top section permanently jointed thereto, extending down below the joint with said bottom and having an outwardly-extending flange, an outer bottom shell having an outwardly-extending flange at its upper edge, means for separably uniting said flanges whereby the joint between said inner bottom shell and top section may be rendered accessible, and the solder G closing said joint at the under side, substantially as set forth.

2. In a jacketed kettle, the combination of an inner bottom shell, a top section permanently jointed thereto, extending down below the joint with said bottom, an outer bottom shell, and means for separably uniting the extension of said top section and said outer bottom shell, substantially as set forth.

In testimony whereof we affix our signatures in presence of two witnesses.

MAX W. JOHNS.
WASHINGTON IRVING KAUFMAN.

Witnesses:
D. I. HEYMAN,
JOSEPH SELLIGMAN.